April 3, 1934.   L. T. PULLEN   1,953,722
EGG BEATER
Filed Oct. 22, 1931
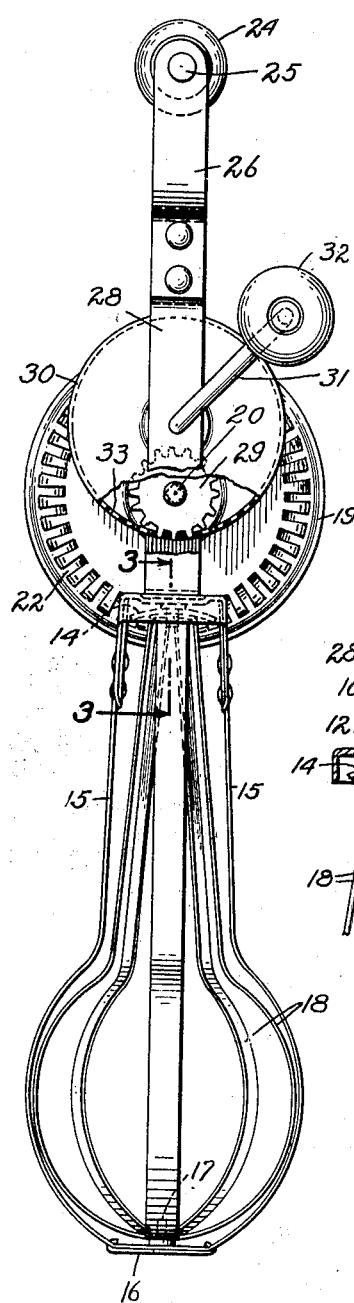
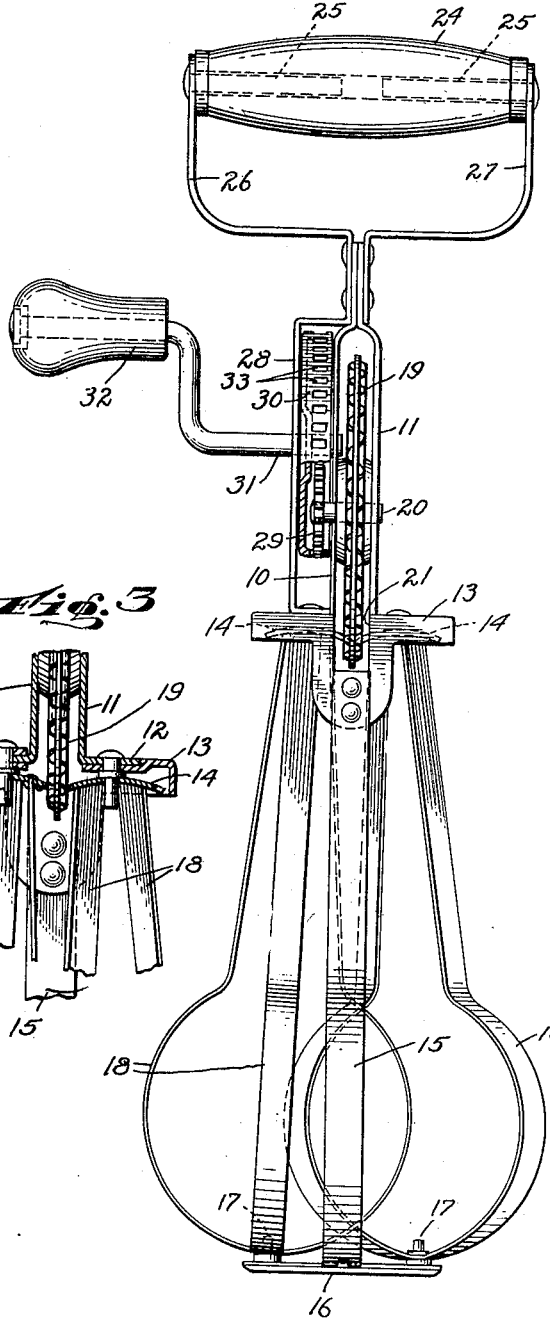
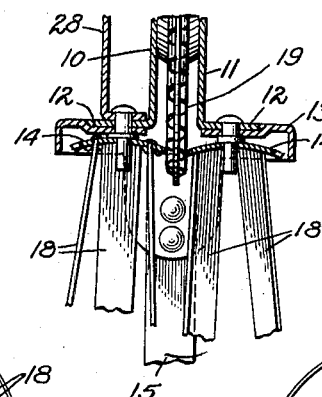
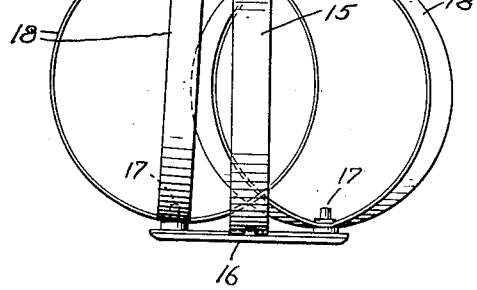
INVENTOR.
LESTER T. PULLEN.
BY
ATTORNEY.

Patented Apr. 3, 1934

1,953,722

UNITED STATES PATENT OFFICE 1,953,722

EGG BEATER

Lester T. Pullen, Bridgeport, Conn., assignor to The Turner and Seymour Manufacturing Company, Torrington, Conn., a corporation of Connecticut Application October 22, 1931, Serial No. 570,347

2 Claims. (Cl. 259—131)

My invention relates to beaters of the manually operable type adapted for beating eggs, cream, and other foods.

An object of the invention is to provide an egg beater of simple and inexpensive construction and of improved efficiency in operation.

A specific object of the invention is to provide an improved drive for egg beaters.

The conventional egg beater has an operating handle fixed to a relatively large driving gear which meshes with a pair of pinions fixed respectively upon a pair of beaters. The rotary speed of the beaters with respect to the handle will depend upon the relative pitch diameters of the gear and pinions. The higher the speed of the beaters is stepped up, the better, because it permits of turning the handle more slowly and hence with less effort upon the part of the operator. However, there are practical limits to the relative size of the driving and driven gears. An unduly large driver makes the egg beater cumbersome and unwieldy.

An object of my invention is to overcome this difficulty by gearing the handle to the main drive wheel instead of connecting it directly thereto. This compound gearing results in speeding up the beaters and also effects a flywheel action, so that less sustained effort is required to keep the beaters running at requisite speed.

Another object of the invention is to provide a beater with such a compound drive mechanism in which the mechanism is compactly arranged so that it takes up scarcely any more room than the driving mechanism now commonly in use.

Other objects and advantages of my invention will appear in the following description of a preferred embodiment and thereafter the novelty and scope of the invention will be pointed out in the claims.

In the accompanying drawing,

Fig. 1 is a view in front elevation of my improved egg beater with a portion thereof broken away to reveal certain details;

Fig. 2 is a view in side elevation looking from the right-hand side of Fig. 1 with a portion of the egg beater broken away; and Fig. 3 is a view in section on an enlarged scale taken on the line 3—3 of Fig. 1.

The main frame of the egg beater shown in the drawing, is composed of a pair of side frame members 10 and 11 fastened together at their upper ends. Each member is bent outward at its lower end to form an attachment foot 12 which is riveted or otherwise secured to a cross-head 13. The latter is formed with a downwardly projecting peripheral flange which serves as a guard for a pair of pinions 14 journaled in the cross head. Two lower frame members 15 are secured at their upper ends to the cross-head and at their lower ends to a base plate 16. The latter provides bearings 17 for a pair of beaters 18 which at their upper ends are fixed to the pinions 14 respectively. The beaters may be of any suitable form.

The frame members 10 and 11 are spaced apart to receive a main drive wheel 19 therebetween, said wheel being fixed upon a shaft 20 journaled in the frame members 10 and 11. The drive wheel projects through a slot 21 in the cross head between the pinions 14 and is formed on opposite faces thereof with teeth 22 which mesh with the teeth of said pinions. Preferably the drive wheel is formed of sheet metal with teeth upset on opposite faces thereof, but it may also consist of a cast or cut gear and may be either a crown gear or a beveled gear, the pinions, in the latter case, being correspondingly beveled to mesh with the driver.

At the upper end of the egg beater there is a handle comprising a grip 24 mounted to turn upon a pair of opposed studs 25 which in turn are secured respectively in a yoke frame formed of a pair of strips 26 and 27. These strips are riveted to the upper end of the frame members 10 and 11. The strip 26, however, is formed with an extension 28 which runs in parallel spaced relation to the member 10 and is turned inwardly at its lower end where it is secured to the foot 12 of the member 10. The shaft 20 projects into the space between the frame members 10 and 28 and has a pinion 29 fixed thereto. This pinion meshes with an internal gear 30 fixed upon a shaft 31 journaled in the frame members 10 and 28. An extension of this shaft projecting from the auxiliary frame member 28 is bent to form a crank and is fitted with an operating handle 32. While the gear 30 may be a cut or cast gear, it may also be conveniently formed of sheet metal as shown in the drawing. The gear then consists of a disc which is cupped to provide a peripheral flange and this flange is formed with perforations 33 into which the teeth of the pinion 20 may be received.

The egg beater is operated in the usual manner by holding the grip 24 in one hand and turning the handle 32 with the other hand. Because the handle 32 is not directly secured to the main driver 19 but is connected thereto through the internal gear 30 and pinion 29, the beaters will be driven at a much higher speed. It will be observed that the additional gearing provided by my invention takes up practically no additional room vertically and adds but little to the width of the apparatus. Thus I have provided mechanism which will render an egg beater much more efficient and which may be operated with less effort without making the egg beater appreciably larger or more cumbersome.

While I have described a preferred embodiment of my invention, I wish it to be understood that this is to be taken as illustrative and not limitative and that I reserve the right to make such changes in form, construction and arrangement of parts as fall within the spirit and scope of the following claims.

I claim:

1. A portable manually-operable egg beater comprising a frame, a pair of pinion-bearing beaters journaled in the frame, a main drive wheel mounted on the frame, the beater pinions meshing with the drive wheel on opposite sides thereof, a pinion fixed to the drive wheel, a gear wheel carried by the frame and meshing with the latter pinion, and an operating handle fixed to said gear wheel, said gear wheel lying wholly above said pinions.

2. A portable manually-operable egg beater comprising a main frame, a pair of beaters journaled therein, a main drive wheel carried by the frame and driving said beaters, a handle comprising a pair of side frame members fixed to the top of the main frame, one of said members having an extension disposed in spaced parallel relation to the main frame, a pinion in the space between said extension and the frame, said pinion being fixed to rotate with the main drive wheel, an internal gear meshing with the pinion, and a crank-handle journaled in the frame and said extension, said internal gear being fixed upon said crank handle.

LESTER T. PULLEN.